United States Patent

Viel

[15] 3,643,821
[45] Feb. 22, 1972

[54] FRONT LOADER-TYPE ROCK PICKER

[72] Inventor: Floyd W. Viel, P.O. Box 632, Billings, Mont. 59103

[22] Filed: Aug. 7, 1970

[21] Appl. No.: 61,929

[52] U.S. Cl............................................214/140, 214/145
[51] Int. Cl..........................................................B65g 61/00
[58] Field of Search................214/140, 144, 145, 131, 780, 214/731; 294/120, 122

[56] References Cited

UNITED STATES PATENTS

| | | | |
|---|---|---|---|
| 2,397,487 | 4/1946 | Holdeman et al | 214/780 |
| 2,701,072 | 2/1955 | Chambers et al | 214/140 |
| 855,283 | 5/1907 | Compton | 214/731 |

Primary Examiner—Gerald M. Forlenza
Assistant Examiner—John Mannix
Attorney—Berman, Davidson and Berman

[57] ABSTRACT

A rock picker attachment consisting of a crossbar adapted to be pivotally connected to the end of a boom structure swingably carried by the front portion of a tractor, the boom structure being provided with hydraulic cylinders for pivoting the crossbar around a transverse horizontal axis. Side-by-side L-shaped members are adjustably clamped to the crossbar, the L-shaped members having forwardly projecting bottom arms defining prongs.

9 Claims, 9 Drawing Figures

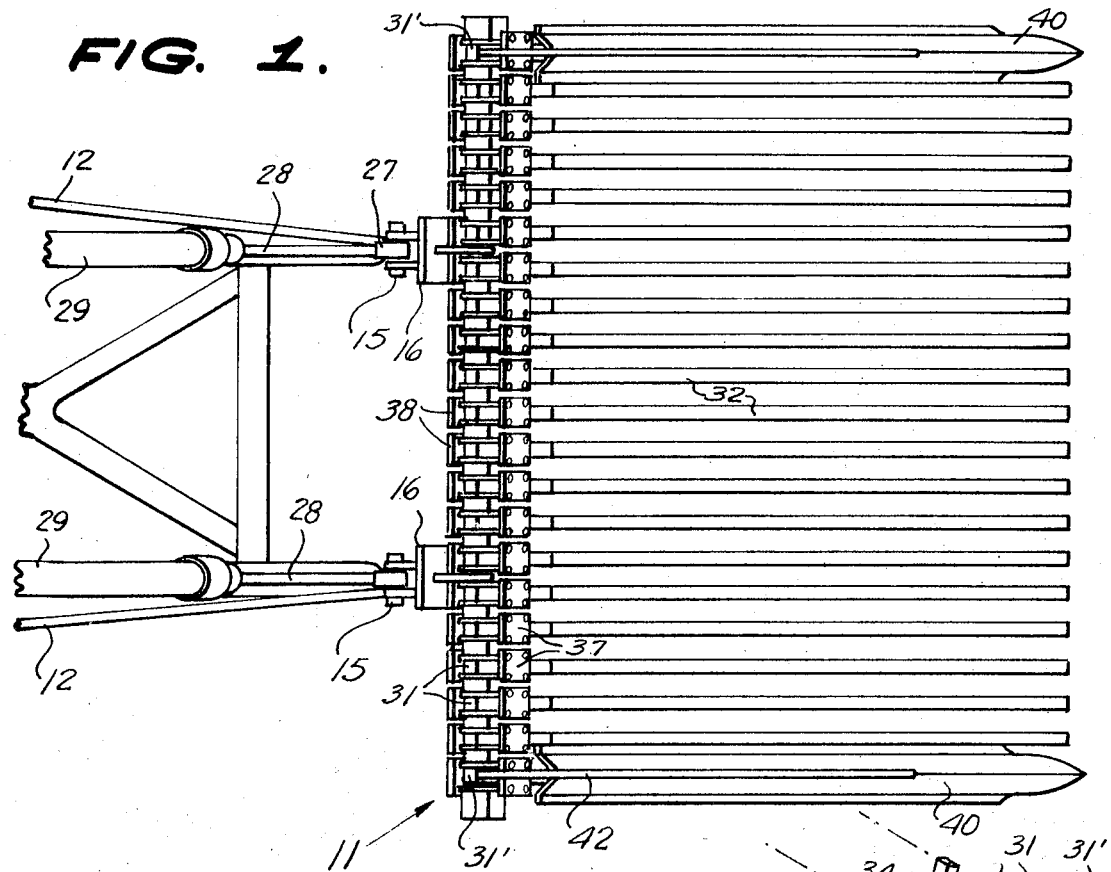
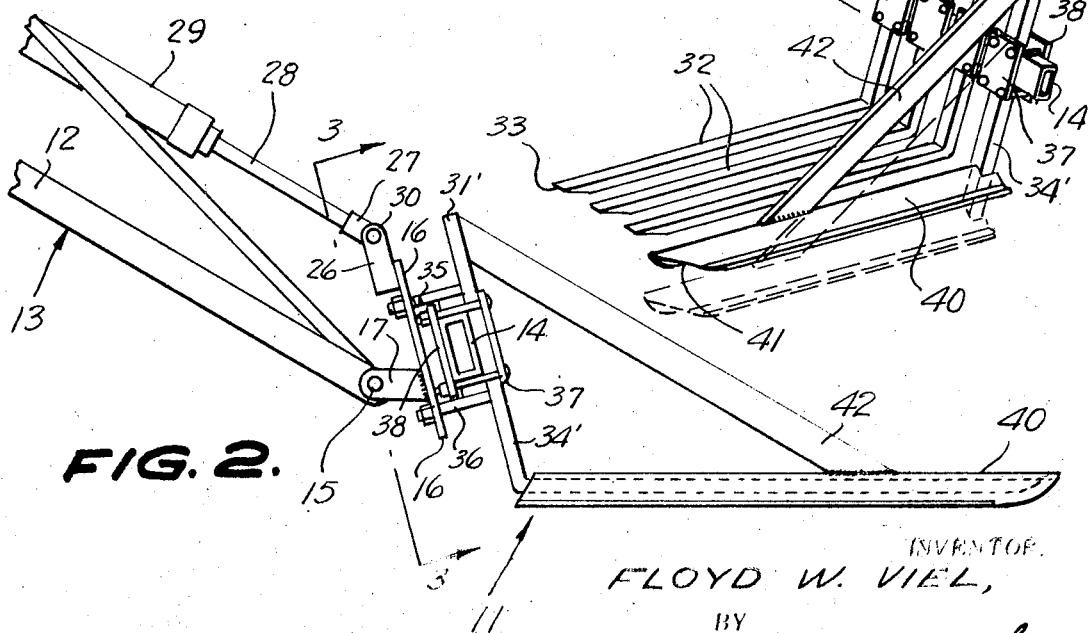

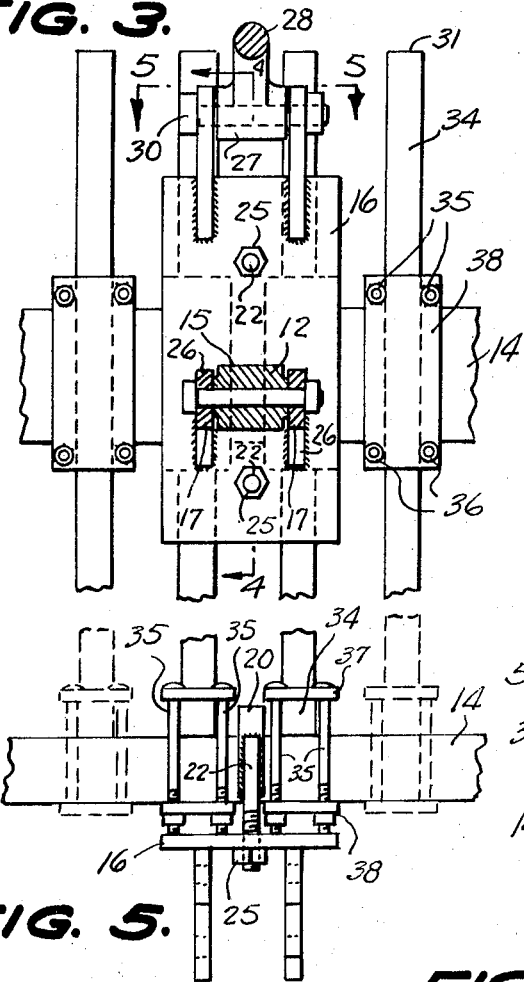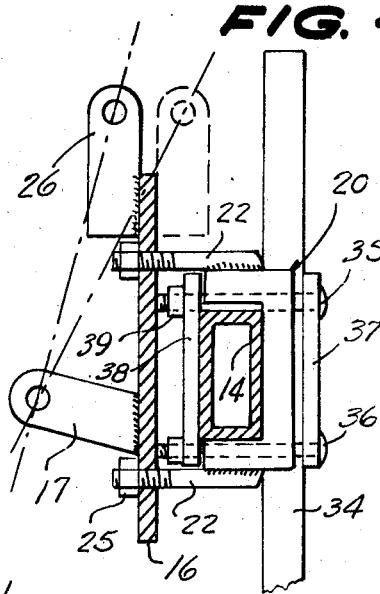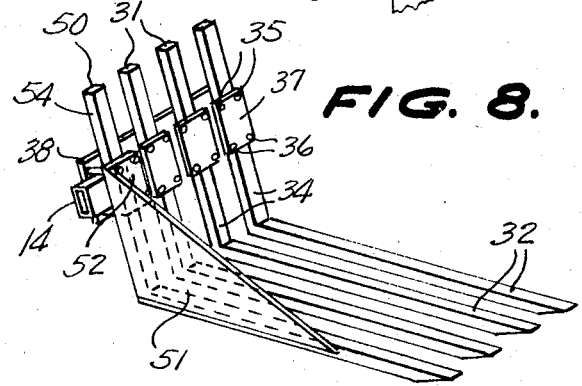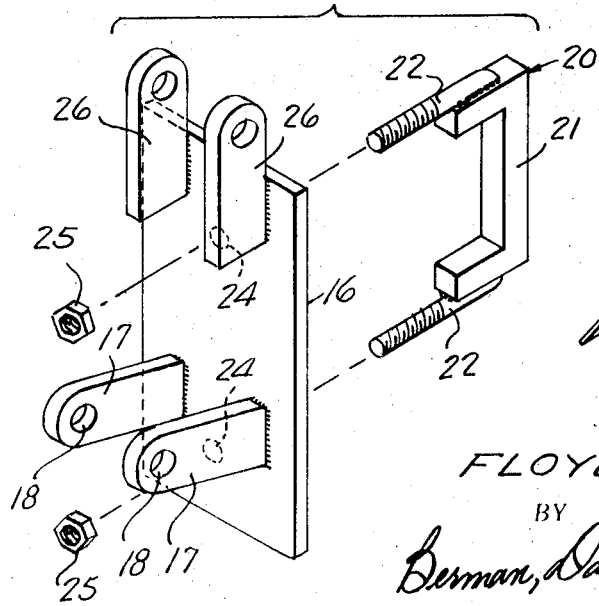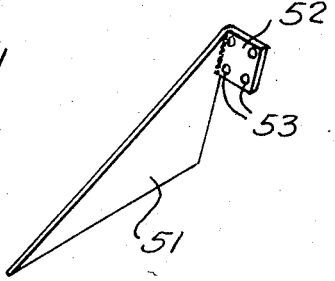

FRONT LOADER-TYPE ROCK PICKER

This invention relates to material-handling assemblies, and more particularly to a rock picker attachment adapted to be secured to forwardly extending boom structure carried by a tractor.

A main object of the invention is to provide a novel and improved stone-picking device which is relatively simple in construction, which can be easily installed on the forwardly extending boom structure of a tractor, and which is easy to adjust for efficient operation.

A further object of the invention is to provide an improved rock picker attachment for a tractor, the attachment involving relatively inexpensive components, being sturdy in construction, being adjustable so that it can be located in an efficient working position close to the ground, and being especially suitable for picking up loose rocks or for collecting and conveying other materials such as manure, trash, bales of material, and the like.

A still further object of the invention is to provide an improved rock picker attachment for use with a front end loader type of vehicle, the attachment having relatively few parts, being adjustable in accordance with the physical characteristics of the vehicle with which it is used, and requiring no welding or other modification of the vehicle.

Further objects and advantages of the invention will become apparent from the following description and claims, and from the accompanying drawings, wherein:

FIG. 1 is a top plan view of an improved rock picker attachment according to the present invention, shown connected to the ends of the front loader arms of a tractor.

FIG. 2 is a side elevational view of the structure shown in FIG. 1.

FIG. 3 is an enlarged transverse cross-sectional view taken substantially on the line 3—3 of FIG. 2.

FIG. 4 is a cross-sectional view taken substantially on the line 4—4 of FIG. 3.

FIG. 5 is a fragmentary plan view taken substantially on the line 5—5 of FIG. 3 with the loader arm piston rod connection omitted.

FIG. 6 is an exploded perspective view of a bracket plate and associated U-bolt structure employed therewith, forming part of the rock picker attachment shown in FIG. 1.

FIG. 7 is a perspective view of a side portion of the rock picker attachment of FIGS. 1 to 6.

FIG. 8 is a perspective view of a side portion of a modified form of rock picker attachment according to the present invention.

FIG. 9 is a perspective view of the triangular end retaining plate employed in the modification shown in FIG. 8.

Referring to the drawings, 11 generally designates a rock picker attachment constructed in accordance with the present invention. The attachment 11 comprises an assembly, presently to be described, supported on a transverse crossbar member 14 of any suitable cross-sectional shape, for example, of hollow rectangular cross-sectional shape, as is clearly illustrated in FIGS. 2 and 4. The crossbar 14 is clampingly secured to a pair of spaced generally rectangular bracket plates 16,16 by respective U-bolts 20. U-bolts 20 each comprises a main body portion 21 which is generally U-shaped and which is shaped to snugly receive the transverse crossbar 14, the top and bottom arms of the body 21 being provided with threaded shank members 22,22 welded thereto. The threaded shank members 22 extend through apertures 24 provided in the associated bracket plate 16 and are tightly secured thereto by nuts 25, whereby the bracket plates are clamped to the crossbar 14.

The bracket plates are provided at their lower portions with spaced apertured lugs 17,17 projecting rearwardly, namely, to the left, as viewed in FIG. 2, and receiving therebetween the ends of the arms 12 of a conventional front loader structure 13 carried by the associated tractor. The front ends of the arms 12 are pivotally secured to the bracket plates by pivot pins 15 engaged therethrough and through the respective pairs of lugs 17,17. The bracket plates 16 and hence the crossbar 14 clamped thereto, are thereby pivoted to the front ends of the boom arms 12 for rotation around a horizontal transverse axis defined by the transversely aligned pivot pins 15,15.

The upper portions of the bracket plates 16 are likewise provided with upwardly projecting pairs of apertured lugs 26,26 receiving therebetween the clevis elements 27 secured to the ends of the piston rods 28 of respective hydraulic cylinders 29, pivotally connected at their rear ends to the boom structure 13 by means not shown. The clevis elements 27 are pivotally connected to the lugs 26 by transverse pivot pins 30. Extension and retraction of the piston rods 28 therefore produces rotation of the bracket plates 16 and the crossbar 14 carried thereby around the transverse pivotal axis defined by the pivot pins 15,15. Apertured lugs 26 may be located either forwardly or rearwardly on bracket plate 16.

Adjustably clamped to the crossbar 14 are a series of side-by-side generally L-shaped members 31 having forwardly extending bottom arms 32 which are tapered at their forward ends, as shown at 33, to define tines. The members 31 have upstanding rear arms 34 which are adjustably clamped to the crossbar 14 by respective pairs of bolts 35,35 and 36,36 at their top and bottom portions which extend through the corner portions of respective pairs of rectangular clamping plates 37 and 38 between which each arm 34 and the crossbar 14 are received, as is clearly shown in FIGS. 4 and 5. The bolts 35 and 36 are provided at their rear ends with the fastening nuts 39 to provide clamping force between the plates 37 and 38.

As will be readily apparent, the members 31 may be adjusted vertically to a desired height, in accordance with the conditions under which the attachment is used and in accordance with the characteristics of the boom structure 13 to which the rock picker attachment is connected.

The end members of the assembly, shown at 31' have upstanding rear arms 34' which are clamped to the crossbar 14 in the same manner as the arms 34 and have forwardly extending lower arms on which are welded downwardly facing channel-shaped skid members 40. The skid members 40 may have any desirable conventional shape, for example, may be of inverted V-shape. The forward end portions of the skid members 40 slope upwardly and forwardly at their bottom edges, as shown at 41, to facilitate smooth movement of the skid members along the ground. The end members 31' are provided with diagonal platelike side braces 42 which also serve as retaining means for the scoop structure defined by the side-by-side L-shaped members 31 arrayed between members 31',31'.

In the modification illustrated in FIG. 8, the end members shown at 50, have triangular retaining plates 51 extending adjacent their top and bottom arms so as to effectively cover the corner therebetween, each plate 51 being provided at its top corner with a laterally projecting rectangular fastening plate 52 similar in shape to the plates 37, and being similarly provided with corner apertures to receive fastening bolts 35 and 36 to secure the arm 54 between the plate element 52 and a cooperating plate 38. Thus, the end members 50 are clamped to the crossbar 14 in the same manner as the members 31 and can be similar adjusted relative to crossbar 14. Thus, the triangular plates 51 serve as retaining means in the same manner as the platelike brace member 42 of the previously described form of the invention.

In the operation, with the rock picker attachment connected to the boom arms 12,12 of the front leader structure 13, with the elements adjusted so that the bottom arms and skids 40 will be horizontal and at ground level when the boom structure 13 is lowered, the tractor may be moved forwardly to cause rocks or other objects to be collected to be deposited on the tines 32. When a sufficient load has been collected, the boom structure 13 is elevated and the load may then be carried to its destination. At said destination the hydraulic cylinders 29 are operated to extend their piston rods 28, causing the scoop assembly to be rotated in a clockwise direction, as viewed in FIG. 2, whereby the load of rocks or other objects is allowed to discharge from the scoop assembly by gravity. The tractor may then return to the area to be cleared and the scoop structure may then again be lowered to ground level with the tines 32 extending forwardly and horizontally so as to repeat the above-described process.

It will be apparent that the attachment of the present invention can be employed with loaders of the type having two hydraulic cylinders 29 for rotating the scoop assembly, or alternatively, with loaders of the type employing only one hydraulic cylinder, centrally connected, for this purpose.

While certain specific embodiments of an improved rock picker attachment for the front loader arms of a tractor have been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In combination, a boom frame adapted to be swingably connected to the front portion of a tractor, said boom frame having a plurality of forwardly extending arms, a transverse bar member, means pivotally connecting said bar member to the forward ends of said arms for rotation around a transverse horizontal axis, a plurality of side-by-side generally L-shaped members having forwardly projecting bottom arms defining tines, and means adjustably securing said L-shaped members to said transverse bar member, wherein said L-shaped members have upwardly projecting upper arms and said securing means comprises respective pairs of clamping plates between which said upper arms and transverse member are received, and clamping bolts connecting the clamping plates adjacent their respective corners.

2. The structural combination of claim 1, and wherein the means pivotally connecting said transverse bar member to said forward ends of the boom frame arms comprises respective bracket plates, respective U-bolts clampingly securing said transverse bar member to said bracket plates, and rearwardly projecting lugs on the bracket plates pivotally connected to said forward ends of the boom frame arms.

3. The structural combination of claim 2, and wherein the opposite end L-shaped members are provided with ground engaging supporting skids.

4. The structural combination of claim 2, and wherein the opposite end L-shaped members are provided with platelike side retaining members adjacent their bottom and upper arms.

5. The structural combination of claim 4, and wherein said bracket plates have upwardly projecting lugs and said hydraulic cylinders are connected between said upwardly projecting lugs and said boom structure.

6. The structural combination of claim 5, and wherein each bracket plate has a pair of rearwardly projecting lugs receiving a forward end of a boom frame arm therebetween and is provided with a transverse pivot pin extending through the pair of lugs and said forward end of the boom frame arm.

7. The structural combination of claim 6, and wherein said transverse bar member is substantially rectangular in cross section and the U-bolts are of substantially rectangular shape of a size to conformably and nonrotatably engage on said transverse bar member.

8. The structural combination of claim 7, and wherein said upwardly projecting lugs are parallel and are apertured at their top ends to receive a pivot pin for pivotally connecting the upwardly projecting lugs to the piston rods of the hydraulic cylinders, and wherein said rearwardly projecting lugs are parallel and are apertured at their rear ends to receive said transverse pivot pins.

9. The structural combination of claim 8, and wherein said U-bolts each comprises a generally U-shaped main body portion shaped to snugly receive said transverse bar member, the arms of said main body portion having respective threaded shank members rigidly secured thereto and being engaged through its associated bracket plate.

* * * * *